US00RE49539E

(19) United States
(12) Reissued Patent
Park et al.

(10) Patent Number: US RE49,539 E
(45) Date of Reissued Patent: May 30, 2023

(54) METHOD AND APPARATUS FOR TRANSMITTING UPLINK SIGNAL, AND METHOD AND APPARATUS FOR GENERATING UPLINK SIGNAL IN COMMUNICATION SYSTEM

(71) Applicant: Electronics and Telecommunications Research Institute, Daejeon (KR)

(72) Inventors: Hyeong-Geun Park, Daejeon (KR); Il-Gyu Kim, Chungcheongbuk-do (KR); Young-Jo Ko, Daejeon (KR); Kap-Seok Chang, Daejeon (KR); Hyo-Seok Yi, Daejeon (KR); Young-Hoon Kim, Daejeon (KR); Seung-Chan Bang, Daejeon (KR)

(73) Assignee: Electronics and Telecommunications Research Institute, Daejeon (KR)

(21) Appl. No.: 15/367,206

(22) Filed: Dec. 2, 2016

Related U.S. Patent Documents

Reissue of:
(64) Patent No.: 8,902,859
Issued: Dec. 2, 2014
Appl. No.: 13/751,633
Filed: Jan. 28, 2013

U.S. Applications:
(63) Continuation of application No. 12/439,223, filed as application No. PCT/KR2007/004211 on Aug. 31, 2007, now Pat. No. 8,391,250.

(30) Foreign Application Priority Data

Sep. 1, 2006 (KR) ..... 10-2006-0084087
Dec. 27, 2006 (KR) ..... 10-2006-0134424
(Continued)

(51) Int. Cl.
*H04W 4/00* (2018.01)
*H04L 27/26* (2006.01)
(Continued)

(52) U.S. Cl.
CPC ..... *H04L 27/2602* (2013.01); *H04J 11/00* (2013.01); *H04J 13/0074* (2013.01);
(Continued)

(58) Field of Classification Search
CPC ..... H04W 72/042
(Continued)

(56) References Cited

U.S. PATENT DOCUMENTS 5,742,678 A * 4/1998 Dent ..... H04B 1/707 380/270
5,963,601 A 10/1999 Pon et al.
(Continued)

FOREIGN PATENT DOCUMENTS

CN 1262824 8/2000
KR 10-0326182 B1 7/2002
WO 2006/009715 A1 1/2006

OTHER PUBLICATIONS

Office Action dated Sep. 19, 2011 in U.S. Appl. No. 12/439,223.
(Continued)

*Primary Examiner* — Nick Corsaro
(74) *Attorney, Agent, or Firm* — Insight Law Group, PLLC; Seung Lee

(57) ABSTRACT

When a terminal generates an uplink signal in a communication system, the terminal hops a sequence for differentiating itself from another terminal with time. The terminal generates the uplink signal by multiplying a transmission symbol by a sequence of a transmission time corresponding to the transmission symbol.

24 Claims, 13 Drawing Sheets

(30) Foreign Application Priority Data

Feb. 5, 2007 (KR) ..... 10-2007-0011368
Mar. 30, 2007 (KR) ..... 10-2007-0031357
May 30, 2007 (KR) ..... 10-2007-0052549

(51) Int. Cl.

| | |
|---|---|
| ***H04L 25/03*** | (2006.01) |
| ***H04W 72/04*** | (2023.01) |
| ***H04L 5/00*** | (2006.01) |
| ***H04J 11/00*** | (2006.01) |
| ***H04J 13/00*** | (2011.01) |
| ***H04L 1/1829*** | (2023.01) |
| ***H04L 1/1607*** | (2023.01) |
| ***H04L 1/1867*** | (2023.01) |

(52) U.S. Cl.
CPC ..... *H04L 1/1692* (2013.01); *H04L 1/1861* (2013.01); *H04L 1/1887* (2013.01); *H04L 5/0021* (2013.01); *H04L 25/03866* (2013.01); *H04W 72/04* (2013.01); *H04L 5/0048* (2013.01); *H04L 5/0053* (2013.01)

(58) Field of Classification Search
USPC ..... 379/329
See application file for complete search history.

(56) References Cited

U.S. PATENT DOCUMENTS 6,160,803 A 12/2000 Yuen et al.
6,542,478 B1 4/2003 Park
7,068,703 B2 6/2006 Maric
7,724,777 B2 5/2010 Sutivong et al.
7,848,438 B2 * 12/2010 Baum ..... H04L 27/2613 375/299
8,116,398 B2 * 2/2012 Sakata ..... H04B 7/06 375/267
2004/0120422 A1 6/2004 Lin et al.
2005/0152327 A1 * 7/2005 Erlich ..... H04L 27/2602 370/343
2005/0180386 A1 * 8/2005 Hansen ..... H04L 27/2613 370/350
2005/0201326 A1 * 9/2005 Lakkis ..... H04B 1/71635 370/329
2005/0233710 A1 * 10/2005 Lakkis ..... H04B 1/71632 455/102
2006/0035643 A1 2/2006 Vook et al.
2006/0039343 A1 * 2/2006 Anderson ..... H04J 13/16 370/342
2006/0056360 A1 * 3/2006 Parkvall et al. ..... 370/335
2006/0067421 A1 * 3/2006 Walton ..... H04B 7/0615 375/267
2006/0104379 A1 * 5/2006 Li ..... H04L 1/0003 375/267
2007/0041404 A1 * 2/2007 Palanki ..... H04J 13/10 370/479
2007/0104085 A1 * 5/2007 Sambhwani ..... H04K 3/224 370/203
2007/0183386 A1 8/2007 Muharemovic et al.
2008/0259892 A1 * 10/2008 Li ..... H04L 25/03006 370/342
2008/0298335 A1 * 12/2008 Lee ..... 370/342

OTHER PUBLICATIONS

Office Action dated Apr. 26, 2012 in U.S. Appl. No. 12/439,223.
Notice of Allowance dated Oct. 25, 2012 in U.S. Appl. No. 12/439,223.
Office Action dated Feb. 20, 2014 in U.S. Appl. No. 13/751,633.
Notice of Allowance dated Jul. 28, 2014 in U.S. Appl. No. 13/751,633.
Win, Moe Z. et al., "Ultra-Wide Bandwidth Time-Hopping Spread-Spectrum Impulse Radio for Wireless Multiple-Access Communications," IEEE Transactions on Communications, vol. 48(4):679-689 (2000).
European Office Action for Application No. 07808017.3, 6 pages, dated Nov. 16, 2011.
International Search Report for Application No. PCT/KR2007/004211, 3 pages, dated Dec. 4, 2007.

* cited by examiner

METHOD AND APPARATUS FOR TRANSMITTING UPLINK SIGNAL, AND METHOD AND APPARATUS FOR GENERATING UPLINK SIGNAL IN COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,902,859 issued on Dec. 2, 2014, which is issued from U.S. patent application Ser. No. 13/751,633, filed on Jun. 28, 2013, which* is a continuation of Ser. No. 12/439,223 filed on Oct. 27, 2009, *now U.S. Pat. No. 8,391,250,* which is a 371 national stage filing of International Application No. PCT/KR2007/004211, filed on Aug. 31, 2007, which claims priority to, and the benefit of, Korean Patent Application No. 10-2006-0084087, filed on Sep. 1, 2006, Korean Patent Application No. 10-2006-0134424, filed on Dec. 27, 2006, Korean Patent Application No. 10-2007-0011368, filed on Feb. 5, 2007, Korean Patent Application No. 10-2007-0031357, filed on Mar. 30, 2007, and Korean Patent Application No. 10-2007-0052549, filed on May 30, 2007. The contents of the aforementioned applications are hereby incorporated by reference. This application is also related to Korean Patent Application No. 10-2007-0088097, filed Aug. 31, 2007.

BACKGROUND

The present invention relates to a method and an apparatus for transmitting an uplink signal, and a method and an apparatus for generating an uplink signal in a communication system.

In an orthogonal frequency division multiplexing (OFDM) based communication method, interference does not exist between different users since the different users use different frequencies for data channel. A method for using the different frequencies for the different users is referred to as frequency division multiplexing (FDM). However, code division multiplexing (CDM) that identifies the users by using codes is appropriate for a reference signal or a control channel. The CDM is superior to the FDM since the CDM can efficiently use resources for the reference signal or the control channel. The CDM is classified into a time domain CDM that directly spreads by OFDM symbol units and a frequency domain CDM that spreads in a frequency domain within one OFDM symbol.

In the frequency domain CDM, the different users multiply the same sequence by complex sine waves having different phase slopes before transmitting the same sequence. At this time, a reason why the complex sine wave is used instead of a Hadamard matrix is because orthogonality between the users can be guaranteed through a signal processing at the receiver. Since multiplying any sequence by a complex sine wave with a phase that linearly increases with frequency at the frequency domain is the same as cyclic-shifting in the time domain, a process for multiplying the complex sine wave is referred to as a cyclic-shift process or a cyclic delay process.

The number of users that can be simultaneously admitted in one OFDM symbol when the frequency domain CDM is used may be given by a function of a frequency difference between subcarriers and delay spread in the propagation channel. At this time, granularity of the cyclic-shift of each user is set to be greater than a delay spread in the propagation channel. In a cellular communication environment, the value of the maximum delay spread is arbitrarily set since the maximum delay spread is difficult to be estimated. Accordingly, a channel delay spread of any user may be greater than the cyclic-shift in the cellular communication environment and so, the interference between users may occur.

SUMMARY

The present invention provides a signal transmitting method and apparatus for reducing interference between users in a communication system.

To solve the above technical problem, according to one aspect of the present invention, a method of transmitting an uplink signal in a terminal is provided. The method includes multiplying a first transmission symbol by a first sequence for differentiating the terminal from another terminal, and transmitting the first transmission symbol at a first transmission time. The method further includes multiplying a second transmission symbol by a second sequence for differentiating the terminal from the other terminal, and transmitting the first transmission symbol at a second transmission time different from the first transmission time. The second sequence is different from the first sequence.

According to another aspect of the present invention, a method of generating an uplink signal in a terminal is provided. The method includes hopping a sequence for differentiating the terminal from the other terminal with time, and generating the uplink signal by multiplying a transmission symbol by the sequence of a transmission time corresponding to the transmission symbol.

At this time, the sequence may correspond to a product of a code for differentiating the terminal from the other terminal and a basic sequence, and the code may be hopped with time. Alternatively, the sequence may be a value generated by cyclic-shifting the basic sequence, and the cyclic-shift may be hopped with time. Alternatively, the sequence may be hopped with time based on a cell to which the terminal belongs.

According to still another aspect of the present invention, a method of generating sequences for uplink signals of a plurality of terminals including a first terminal and a second terminal in a communication system is provided. The method includes setting a first sequence for the first terminal, setting a second sequence for the second terminal to be different from the first sequence, and setting hopping patterns of the first sequence and the second sequence according to a transmission time.

At this time, the hopping patterns may be set such that the first sequence of a first transmission time is different from the first sequence of a second transmission time, and the second sequence of the first transmission time is different from the second sequence of the second transmission time. Alternatively, the hopping patterns may be such that, when the first sequence is adjacent to the second sequence at a first transmission time, the first sequence is not adjacent to the second sequence at a second transmission time.

In addition, the first sequence may correspond to a product of a basic sequence and a code for the first terminal, and the second sequence may correspond to a product of the basic sequence and a code for the second terminal.

At this time, the first sequence may be given, by the code for the first terminal, as a sequence generated by shifting the basic sequence by a first cyclic-shift, and the second sequence may be given, by the code for the second terminal, as a sequence generated by shifting the basic sequence by a second cyclic-shift. In addition, the hopping patterns may be patterns for hopping the first and second cyclic-shifts with time. Furthermore, a pattern for changing the basic sequence with time may be set.

Alternatively, the hopping patterns of the first sequence and the second sequence according to the transmission time may be set based on a cell to which the first terminal belongs and a cell to which the second terminal belongs, respectively.

According to a further aspect of the present invention, an apparatus for transmitting an uplink signal in a terminal is provided. The apparatus includes means for multiplying a first transmission symbol by a first sequence for differentiating the terminal from another terminal, and for transmitting the first transmission symbol at a first transmission time; and means for multiplying a second transmission symbol by a second sequence for differentiating the terminal from the other terminal, and for transmitting the first transmission symbol at a second transmission time different from the first transmission time. The second sequence is different from the first sequence.

According to a still further aspect of the present invention, an apparatus for generating an uplink signal in a terminal is provided. The apparatus includes means for hopping a sequence for differentiating the terminal from another terminal with time, and means for generating the uplink signal by multiplying a transmission symbol by the sequence of the transmission time corresponding to the transmission symbol.

According to a still further aspect of the present invention, an apparatus for generating sequences for uplink signals of a plurality of terminals including a first terminal and a second terminal in a communication system is provided. The apparatus includes means for setting a first sequence for the first terminal, means for setting a second sequence for the second terminal to be different from the first sequence, and means for setting hopping patterns of the first sequence and the second sequence according to a transmission time.

According to exemplary embodiments of the present invention, the interference between the uses and/or the interference between the cells can be randomized when the frequency domain CDM method is used.

DETAILED DESCRIPTION

Figure 1:
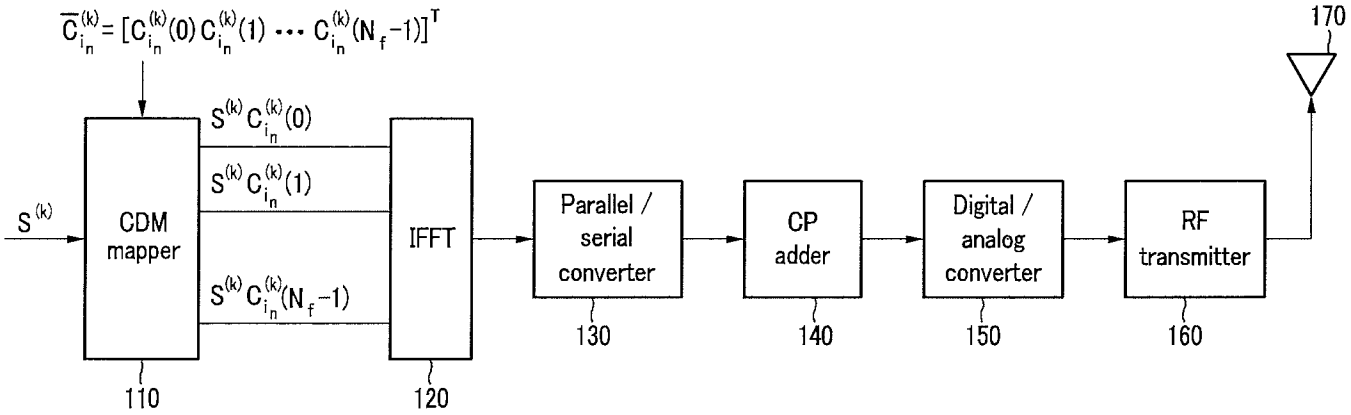
FIG. 1 shows a schematic block diagram of an uplink signal transmitting apparatus according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this detailed description and the claims which follow, unless explicitly described to the contrary, the word "comprise/include" or variations such as "comprises/includes" or "comprising/including" will be understood to imply the inclusion of stated elements but not the exclusion of any other elements. Each block is a unit for processing at least one function or operation, which can be realized by hardware, software, or a combination of hardware and software.

Now, uplink signal transmitting methods and uplink signal transmitting apparatuses according to exemplary embodiments of the present invention will be described with reference to the drawings. While a system using an OFDM modulation/demodulation is described as an example of a communication system in the exemplary embodiments of the present invention, the present invention can be applicable to various communication systems.

First, an uplink signal transmitting apparatus and an uplink signal transmitting method of a terminal according to a first exemplary embodiment of the present invention will be described with reference to FIG. 1 and FIG. 2.

Figure 2:
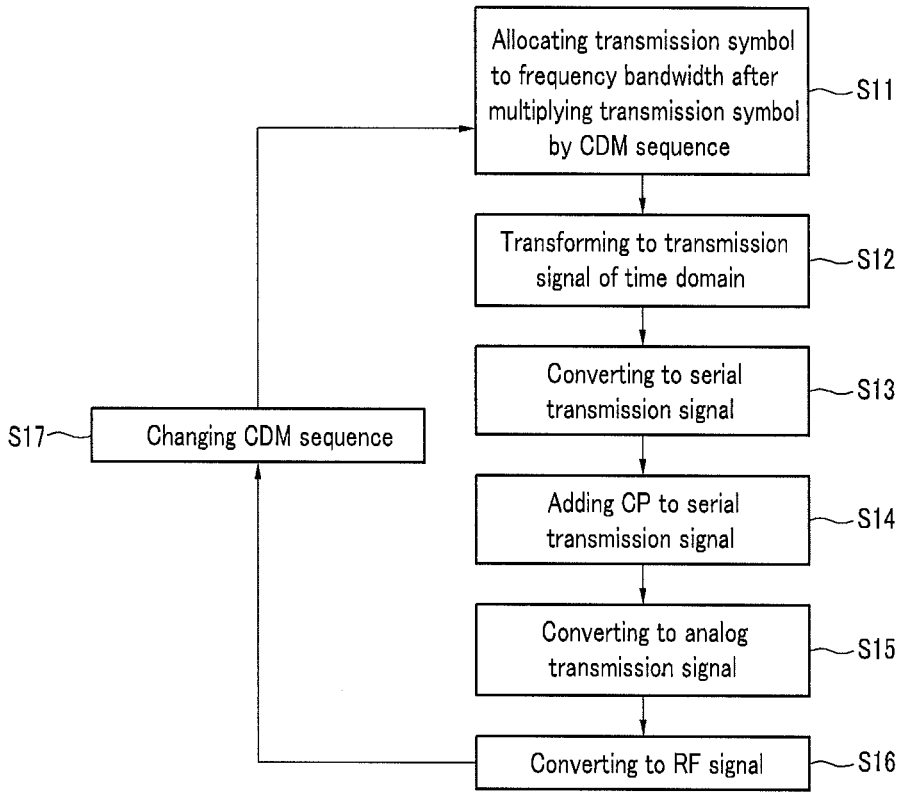
FIG. 2 shows a flow diagram of an uplink signal transmitting method according to the first exemplary embodiment of the present invention.

FIG. 1 shows a schematic block diagram of the uplink signal transmitting apparatus or generating apparatus according to the first exemplary embodiment of the present invention, and FIG. 2 shows a flow diagram of the uplink signal transmitting method or generating method according to the first exemplary embodiment of the present invention.

As shown in FIG. 1, the uplink signal transmitting apparatus includes a CDM mapper 110, an inverse fast Fourier transformer (IFFT) 120, a parallel/serial converter 130, a cyclic prefix (CP) adder 140, a digital/analog converter 150, and a radio frequency (RF) transmitter 160.

Referring to FIG. 2, the CDM mapper 110 multiplies a transmission symbol s to be transmitted at a transmission time #n by a sequence $\bar{c}_{i_n}^{(k)}$ for differentiating it from that of another user (i.e., terminal), and allocates the transmission symbol multiplied by the sequence to a frequency bandwidth (step S11). Since the sequence $\bar{c}_{i_n}^{(k)}$ is for identifying the user with a code, the sequence $\bar{c}_{i_n}^{(k)}$ will be referred as a CDM sequence in the exemplary embodiments of the present invention. The CDM sequence $\bar{c}_{i_n}^{(k)}$ of which the transmission symbol $s^{(k)}$ of the user #k is multiplied may be defined as a vector shown in Equation 1.

$$\bar{c}_{i_n}^{(k)}=[\bar{c}_{i_n}^{(k)}(0)\bar{c}_{i_n}^{(k)}(1)\ \ldots\ \bar{c}_{i_n}^{(k)}(N_f-N)] \qquad \text{Equation 1}$$

The CDM sequence $\bar{c}_{i_n}^{(k)}$ can be defined as the product of a basic sequence $\bar{c}_0$ and the code $\bar{\psi}_{i_n}^{(k)}$ for identifying the user as expressed in Equation 2, and the code $\bar{\psi}_{i_n}^{(k)}$ for identifying the user will be described as a complex sine wave having a characteristic of a linear phase increase in the exemplary embodiments of the present invention. Multiplying of the complex sine wave in the frequency domain corresponds to shifting in the time domain. Accordingly, the CDM sequence $\bar{c}_{i_n}^{(k)}$ is given by cyclic-shifting the basic sequence $\bar{c}_0$ by $\Delta\tau i_n(k)$ in the time domain.

$$\bar{c}_{i_n}^{(k)} = \bar{c}_0 \otimes \bar{\psi}_{i_n}^{(k)} \qquad \text{Equation 2}$$

$$\bar{c}_0 = [\,c_0(0)\ \ c_0(1)\ \ \ldots\ \ c_0(N_f-1)\,]^T$$

$$\bar{\psi}_{i_n}^{(k)} = \left[\,1\ \ e^{-j\frac{2\pi}{N_f}\Delta\tau i_n(k)}\ \ \ldots\ \ e^{-j\frac{2\pi}{N_f}(N_f-1)\Delta\tau i_n(k)}\,\right]^T$$

Here, ⊗ denotes an operation that multiplies each element of one vector by each element of the other vector, $i_n(k)$ denotes a number of the CDM sequence used by the user #k at the transmission time #n, and $\Delta\tau$ denotes a granularity of the cyclic-shift, $N_f$ denotes the number of subcarriers for transmitting the CDM sequence, and the basic sequence $\bar{c}_0$ is given as a vector.

In Equation 2, the cyclic-shift is determined based on the number $i_n(k)$ of the CDM sequence. For example, the cyclic-shift increases by $\Delta\tau$ when the number $i_i(k)$ of the CDM sequence increases by '1'.

The IFFT 120 transforms the transmission symbol that is multiplied by the CDM sequence to a transmission signal of the time domain by performing an inverse fast Fourier transform (step S12). The parallel/serial converter 130 converts the transmission signal of the time domain to a serial transmission signal (step S13), and the CP adder 140 adds the CP to the serial transmission signal (step S14). The digital/analog converter 150 converts the transmission signal to which the CP is added to an analog transmission signal (step S15), and the RF transmitter 160 converts the analog transmission signal to an RF signal and transmits the RF signal through a transmission antenna 170 (step S16).

Next, the CDM mapper 110 sets a CDM sequence $\bar{c}_{i_{n+1}}^{(k)}$ that is different from the CDM sequence $\bar{c}_{i_n}^{(k)}$ of the transmission time #n to a CDM sequence of a transmission time #(n+1) (step S17), and repeats from the step S11. The CDM mapper 110 changes the CDM sequence $\bar{c}_{i_n}^{(k)}$ with time by changing the number $i_n(k)$ of the CDM sequence $\bar{c}_{i_n}^{(k)}$ with time, that is, by changing a cyclic-shift value for the cyclic-shift with time. A pattern for changing the cyclic-shift value may be stored in the terminal in the format of a lookup table.

On the other hand, channels using the CDM sequence according to the first exemplary embodiment of the present invention may be channels for allocating a plurality of users to the same frequency bandwidth at the same time domain. For example, a sounding reference signal or an ACK/NACK channel may use the CDM sequence. The sounding reference signal is a wideband signal that is periodically transmitted by the terminal, and is used for estimating the uplink channel characteristic, for controlling the uplink power, and for estimating the timing. Therefore, all users transmit the sounding reference signals by using the same frequency bandwidth at the same time. The ACK/NACK channel is a channel for informing whether or not the terminal has received downlink packet data, and is required to have excellent performance at a low signal-to-noise ratio (SNR). Therefore, a lot of frequencies and time resources are allocated to the ACK/NACK channel, and a plurality of users simultaneously could access the ACK/NACK channel. Accordingly, the CDM sequence according to the exemplary embodiments of the present invention may be applicable to the sounding reference signal and the ACK/NACK channel.

In FIG. 1, the transmission symbol $s^{(k)}$ is '1' when the CDM sequence is used for the sounding reference signal, and the transmission symbol $s^{(k)}$ is an ACK/NACK symbol to be transmitted when the CDM sequence is used for the ACK/NACK channel.

Figure 3:
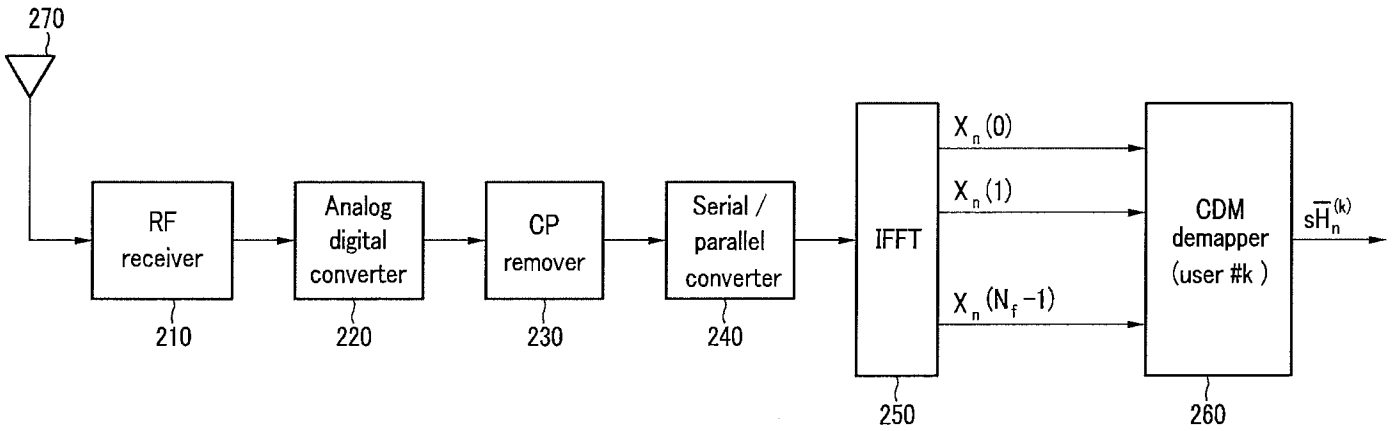
FIG. 3 shows a schematic block diagram of a receiving apparatus in a base station according to the first exemplary embodiment of the present invention.
Figure 4:
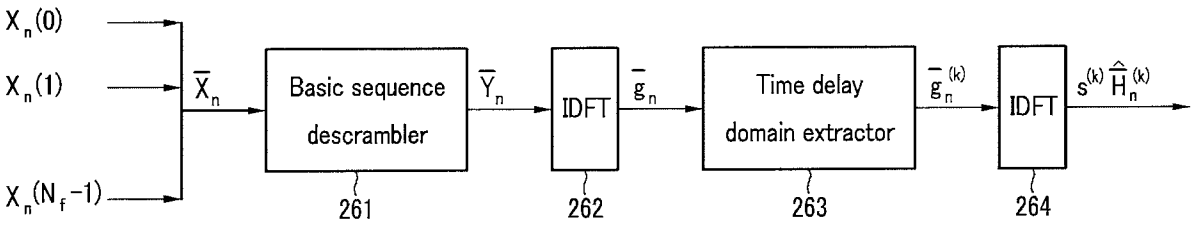
FIG. 4 shows a schematic block diagram of a CDM demapper in the receiving apparatus of FIG. 3.
Figure 5:
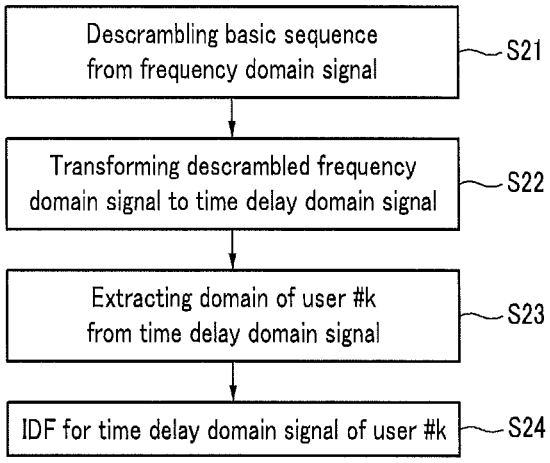
FIG. 5 shows a flow diagram of a method for extracting a desired user signal.
Figure 6:
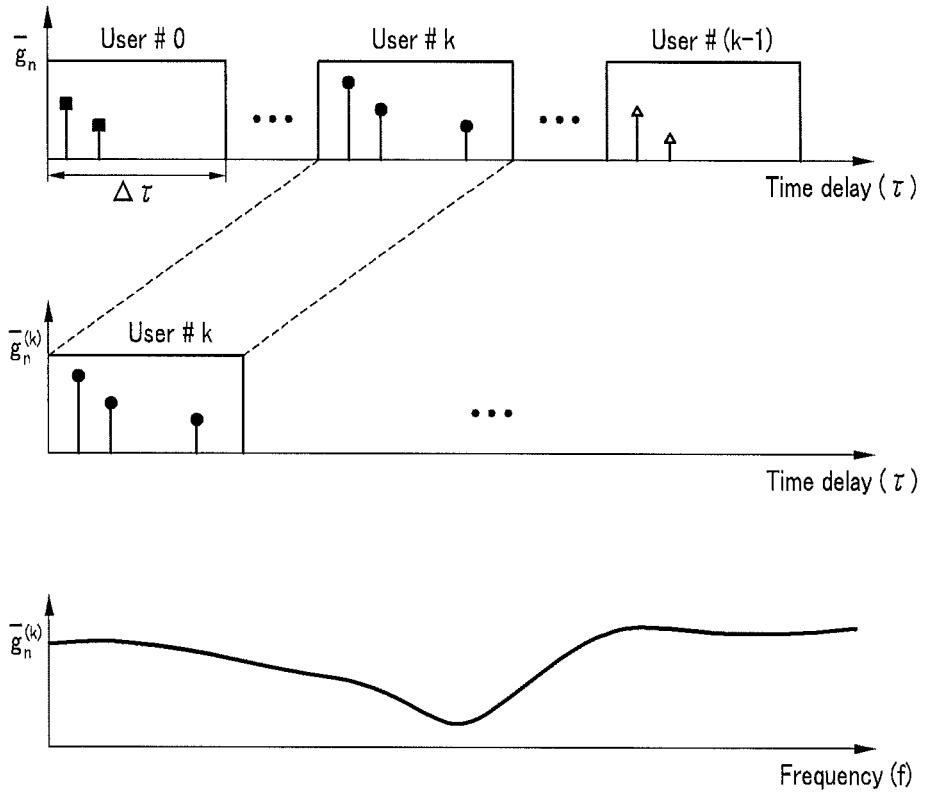
FIG. 6 shows a signal extracted by the CDM demapper of FIG. 4.

FIG. 3 shows a schematic block diagram of a receiving apparatus in a base station according to the first exemplary embodiment of the present invention, and FIG. 4 shows a schematic block diagram of a CDM demapper in the receiving apparatus of FIG. 3. FIG. 5 shows a flow diagram of a method for extracting a desired user signal, and FIG. 6 shows a signal extracted by the CDM demapper of FIG. 4.

As shown in FIG. 3, the receiving apparatus includes an RF receiver 210, an analog/digital converter 220, a CP remover 230, a serial/parallel converter 240, a fast Fourier transformer (FFT) 250, and a CDM demapper 260.

The RF receiver 210 receives K user signals from K terminals through a receiving antenna 270, and converts the K user signals to a baseband signal. The analog/digital converter 220 converts the baseband signal to a digital received signal. The CP remover 230 removes the CP from the digital received signal, and the serial/parallel converter 240 converts the digital received signal from which the CP is removed to a parallel received signal. The FFT 250 transforms the parallel received signal to a frequency domain received signal by performing a fast Fourier transform. The CDM demapper 260 estimates a vector $s^{(k)}\bar{H}_n^{(k)}$ from the frequency domain received signal by using the CDM sequence $\bar{c}_{i_n}^{(k)}$ at the transmission time of the user #k (where k is a number within a range from 0 to (K−1)). At this time, the vector is given by a product of the transmission symbol of the user #k and a channel vector.

The frequency domain received signal $\bar{X}_n$ transformed by the FFT 250 can be expressed as Equation 3.

$$\bar{X}_n = [\,X_n(0)\ \ X_n(1)\ \ \ldots\ \ X_n(N_f-1)\,]^T \qquad \text{Equation 3}$$

$$= \sum_{k=0}^{K-1} s^{(k)}\bar{H}_n^{(k)} \otimes \bar{c}_{i_n}^{(k)}$$

$$\bar{H}_n^{(k)} = \left[\,H_n^{(k)}(0)\ \ H_n^{(k)}(1)\ \ \ldots\ \ H_n^{(k)}(N_f-1)\,\right]^T$$

Here, ⊗ denotes an operation that multiplies each element of one vector by each element of the other vector, $H_n^{(k)}(j)$ denotes a channel value corresponding to the $j^{th}$ subcarrier.

As shown in FIG. 4, the CDM demapper 260 includes a basic sequence descrambler 261, an inverse discrete Fourier transformer (IDFT) 262, a time delay domain extractor 263, and a discrete Fourier transformer (DFT) 264.

Referring to FIG. 5, the basic sequence descrambler 261 descrambles the basic sequence by multiplying each element of the frequency domain received signal $\overline{X}_n$ by each element of the conjugated basic sequence $\overline{c}_0$ as expressed in Equation 4 (step S21).

$$\overline{Y}_n\overline{X}_n \otimes \overline{c}_0^* \qquad \text{Equation 4}$$

Here, $\overline{Y}_n$ denotes an output of the basic sequence descrambler 261.

The IDFT 262 transforms the output $\overline{Y}_n$ of the basic sequence descrambler 261 to a time delay domain signal $\overline{g}_n$ by performing an inverse discrete Fourier transform (step S22). It is assumed that 'k' is allocated to the CDM sequence number $i_n(k)$ of the user #k, and the K user signals are transmitted through the same frequency domain at the same time domain. Then, channel delay profiles of the K user signals appear in the time delay domain signal $\overline{g}_n$ as shown in FIG. 6, and a time delay between the two adjacent users is $\Delta\tau$. The time delay domain extractor 262 extracts a domain allocated to the user #k at the transmission time #n, and moves data of the extracted domain into an origin to output the time delay domain signal $\overline{g}_n^{(k)}$ of the user #k (step S23). The DFT 264 transforms the time delay domain signal $\overline{g}_n^{(k)}$ of the user #k to a desired user signal, i.e., a signal of the user #k, by performing a discrete Fourier transform (step S24).

Next, the effect that a multipath of a user having a channel delay spread has on the other users will be described with reference to FIG. 7 and FIG. 8.

Figure 7:
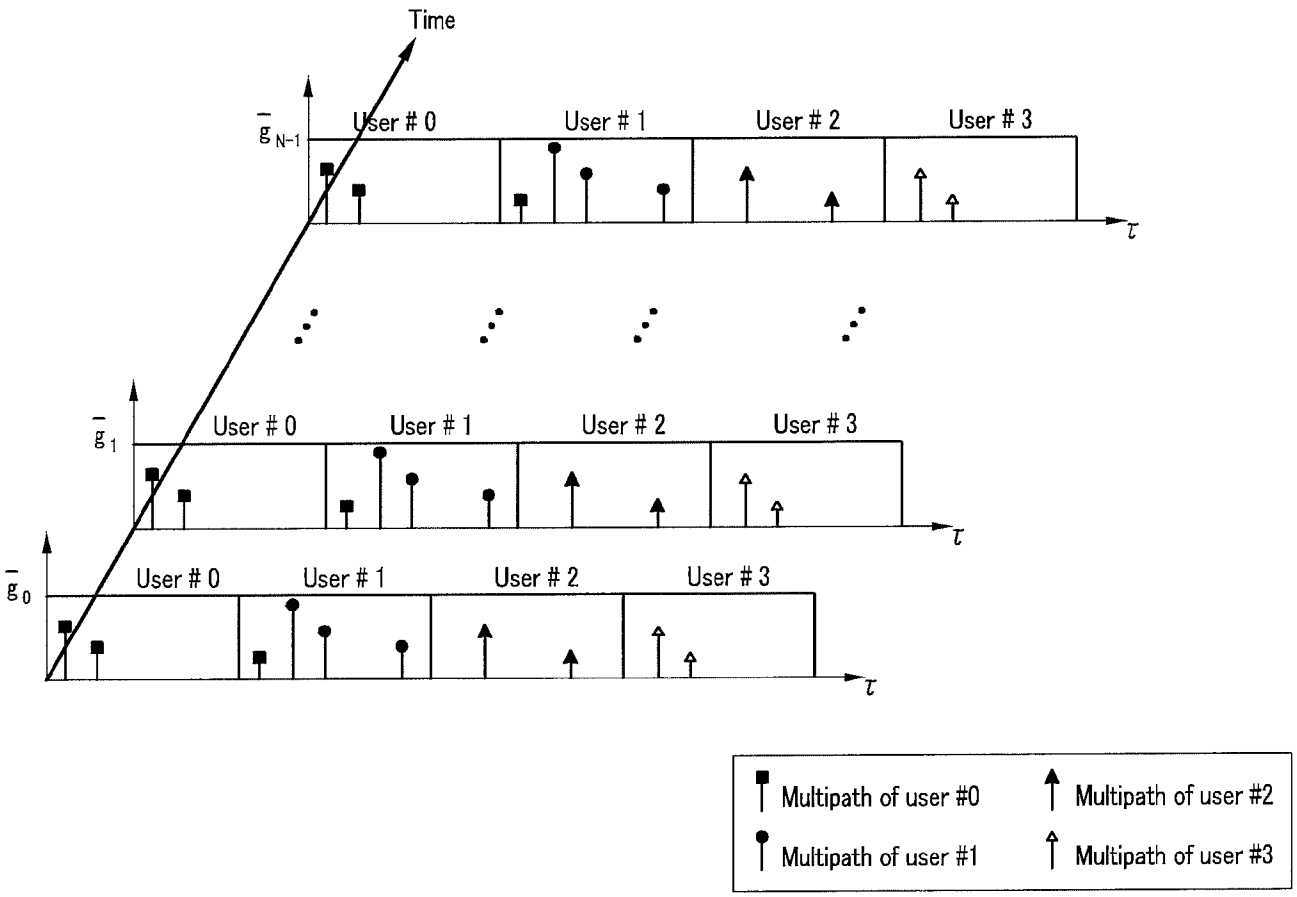
FIG. 7 shows a time delay domain signal according to the passing of time when a general CDM sequence is used.
Figure 8:
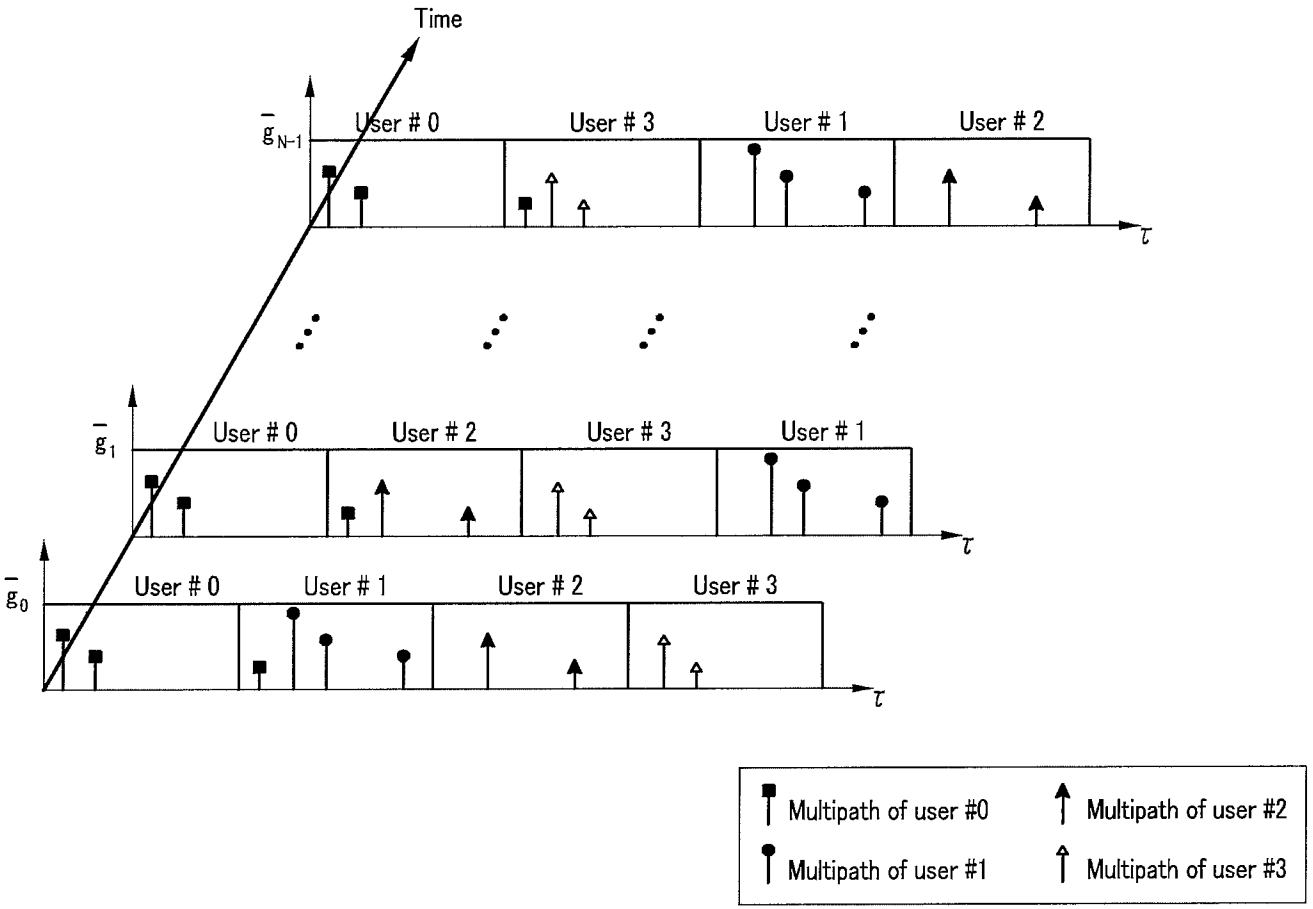
FIG. 8 shows a time delay domain signal according to the passing of time when a CDM sequence is hopped in accordance with the first exemplary embodiment of the present invention.

FIG. 7 shows a time delay domain signal according to the passing of time when a general CDM sequence is used, and FIG. 8 shows a time delay domain signal according to the passing of time when the CDM sequence is hopped in accordance with the first exemplary embodiment of the present invention.

Referring to FIG. 7, a multipath of a user #0 having the channel delay spread has the effect on an interval of a user #1 such that interference can occur between the users. If the interference occurs in the sounding reference signal, the channel estimation performance of the user #1 deteriorates. Particularly, the channel estimation performance becomes worse when the user #0 has a larger received power than the user #1. In this case, if the same CDM sequence is continuously allocated to the same user even though time is passed, the multipath of the user #0 continuously has the effect on the interval of the user #1 in the time delay domain signals $\overline{g}_0$–$\overline{g}_{N-1}$ such that the channel estimation performance of the user #1 continues to deteriorate.

As shown in FIG. 8, according to the first exemplary embodiment of the present invention, the CDM sequence of each user is changed with time such that the users that are adjacent to each other in the time delay domain signals are changed. As a result, the interference between the users can be randomized. That is, the multipath of the user #0 has the effect on the interval of the user #1 in the time delay domain signal $\overline{g}_0$, but has the effect on the intervals of the user #2 and the user #3 in the time delay domain signals $\overline{g}_1$ and $\overline{g}_{N-1}$, respectively. Accordingly, the channel estimation performance of only one user is not deteriorated by the multipath of the user #0 but the channel estimation performances of the plurality of users can be randomly deteriorated.

Next, a method for allocating the different CDM sequences to the user with time will be described with reference to Table 1 and Table 2. Table 1 and Table 2 show a CDM sequence allocation method according to the first exemplary embodiment of the present invention.

TABLE 1

| | $i_0$ | $i_1$ | . . . | $i_{N-1}$ |
|---|---|---|---|---|
| User #0 | $m_0(0)$ | $m_0(1)$ | . . . | $m_0(N-1)$ |
| User #1 | $m_1(0)$ | $m_1(1)$ | . . . | $m_1(N-1)$ |
| . . . | . . . | . . . | . . . | . . . |
| User #(K − 1) | $m_{K-1}(0)$ | $m_{K-1}(1)$ | $m_{K-1}(N-1)$ | $m_{K-1}(N-1)$ |

Here, $i_n$ denotes a CDM sequence number of the transmission time #n, and $m_k(n)$ denotes the cyclic-shift value that is transmitted by the user #k at the transmission time #n. The $m_k(n)$ has any one of the cyclic-shift values from 0 to (K−1) as expressed in Equation 5.

$$\forall n, m_k(n) \in \{0,1,2,\ldots,K-1\}, 0 \le k \le K-1 \qquad \text{Equation 5}$$

In order to randomize the interference between the users, two different users use the different CDM sequences at one time domain. In addition, when the two users use the adjacent CDM sequences at one time domain, the two users use CDM sequences that are not adjacent to each other. As shown in an example of Table 2, the base station and the terminal allocate the different cyclic-shift values to the different users at one time domain, hop the cyclic-shift values with time, and allocate the hopped cyclic-shift values to the users. Then, the CDM sequence is hopped with time. The hopping pattern of the cyclic-shift is set such that the two users that have used the adjacent cyclic-shift values at one time domain use the cyclic-shift values that are not adjacent to each other at the other time domain. For example, when the hopping pattern of each user is set as shown in Table 2, the cyclic-shift values of the user #0 and the user #1 are adjacent to each other at the transmission time #0, but the cyclic-shift values of the user #0 and the user #1 are not adjacent to each other.

TABLE 2

| | $i_0$ | $i_1$ |
|---|---|---|
| User #0 | 0 | 3 |
| User #1 | 1 | 5 |
| User #2 | 2 | 2 |
| User #3 | 3 | 0 |
| User #4 | 4 | 4 |
| User #5 | 5 | 1 |

The cyclic-shift hopping pattern is a pattern that is predetermined between the base station and the terminal. The base station informs the terminal of information on the cyclic-shift hopping pattern at initial access, and the terminal and the base station may store the cyclic-shift hopping pattern, respectively. The cyclic-shift hopping pattern may be set by the base station or an upper node of the base station in the communication system. That is, the base station or the upper node may set the CDM sequences on the plurality of user and the cyclic-shift hopping patterns thereof.

Next, exemplary embodiments that respectively apply the cyclic-shift hopping pattern according to the first exemplary embodiment of the present invention to the sounding reference signal and the ACK/NACK channel will be described with reference to FIG. 9 and FIG. 10.

Figure 9:
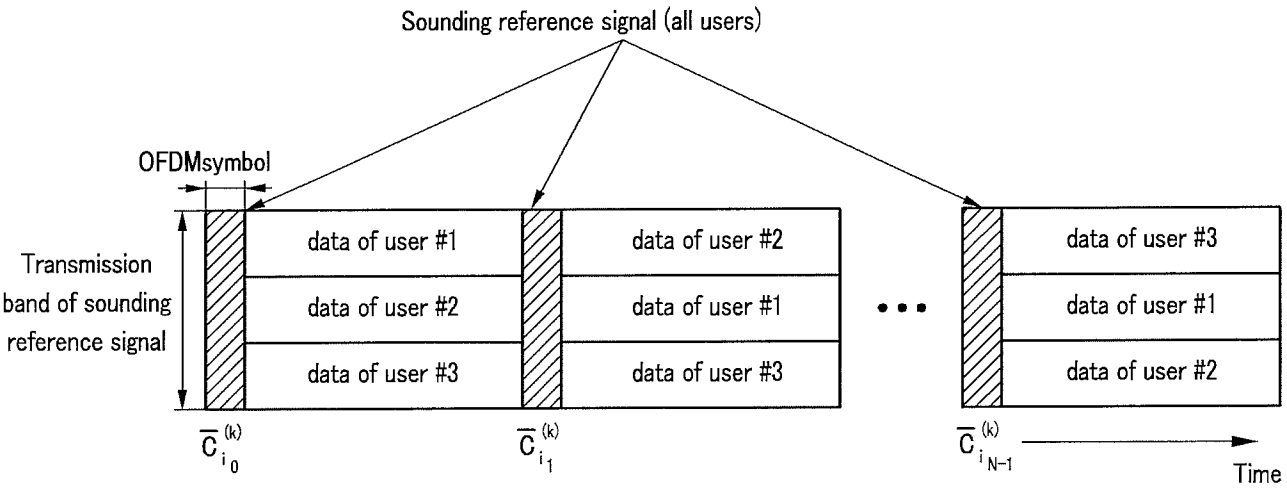
FIG. 9 shows a transmission structure of a sounding reference signal according to a second exemplary embodiment of the present invention.
Figure 10:
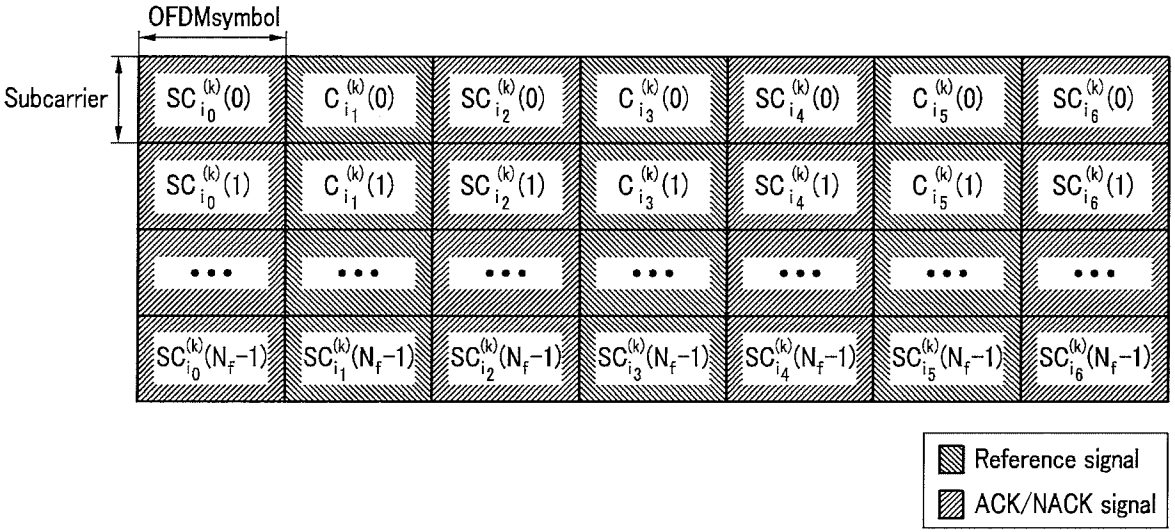
FIG. 10 shows a transmission structure of an ACK/NACK channel according to a third exemplary embodiment of the present invention

FIG. 9 shows a transmission structure of the sounding reference signal according to a second exemplary embodiment of the present invention, and FIG. 10 shows a transmission structure of the ACK/NACK channel according to a third exemplary embodiment of the present invention.

As shown in FIG. 9, all users transmit the sounding reference signals through the same frequency bandwidth at the same time domain. Since the sounding reference signal uses the CDM sequence $\bar{c}_{i_n}^{(k)}$ to which the cyclic-shift of Table 1 is applied, the different CDM sequences are allocated to the different users such that the users are identified. After the base station estimates the channel characteristic of each user by using the sounding reference signal, the base station informs each user of a frequency bandwidth having an excellent channel characteristic. Then, the user may transmit data through the frequency bandwidth that is informed by the base station. In addition, the base station may measure received power of each user and estimate a timing error of each user by using the sounding reference signal.

Meanwhile, since the user may move in a wireless communication system, the terminal periodically transmits the sounding reference signal as shown in FIG. 9. Then, the base station may periodically estimate channel characteristics by using the sounding reference signal. As described with reference to Table 1 and Table 2, the base station and the terminal hop the cyclic-shift value with time when the sounding reference signal is periodically transmitted such that the interference between the users is randomized.

Referring to FIG. 10, the CDM sequence is used for the reference signal, e.g., a pilot signal, and the ACK/NACK signal in the transmission structure according to the third exemplary embodiment. That is, three OFDM symbols are used for the reference signals and four OFDM symbols are used for the ACK/NACK symbols in the structure for transmitting seven OFDM symbols and $N_f$ subcarriers.

The output of the CDM demapper (260 of FIG. 2) at a transmission time of the reference signal is a channel estimate $$\hat{H}_n^{W(k)},$$

n=1, 3, 5 at the corresponding transmission time, and the output of the CDM demapper at a transmission time of the ACK/NACK signal is a product $$y_n = s^{(k)}\hat{H}_n^{W(k)}$$

(n=0, 2, 4, 6) of the ACK/NACK symbol $s^{(k)}$ and the channel estimate at the corresponding transmission time. Then, a receiver of the base station compensates the outputs of the CDM demapper 260 with the channel estimates, and acquires an estimate on the ACK/NACK symbol by summing the compensated outputs as expressed in Equation 6.

$$\hat{s} = \frac{1}{4}\sum_{j=0}^{3} y_{2j}(\hat{H}_{2j}^{W(k)})^* \qquad \text{Equation 6}$$

As shown in FIG. 10, the base station and the terminal may use one cyclic-shift hopping pattern by sequentially allocating the CDM sequences to the reference signal and the ACK/NACK signal in order of the transmission time. Alternatively, the base station and the terminal may set the cyclic-shift hopping pattern for the reference signal to be different from the cyclic-shift hopping pattern of the ACK/NACK signal. As a further alternative, the base station and the terminal may apply the cyclic-shift hopping pattern to any one of the reference signal and the ACK/NACK signal.

While it has been described that four symbols such as ACK/NACK symbols transmit the same symbols $s^{(k)}$ in FIG. 10, the cyclic-shift hopping pattern according to the first exemplary embodiment of the present invention can be applicable to a channel quality indicator (CQI) channel. The CQI channel is used when the terminal transmits downlink channel information to the base station. In CQI channel, different symbols can be transmitted through the whole data blocks, i.e., the OFDM symbols, except for the reference signals.

As described above, while it has been described that K cyclic-shift values are used for the K users in the first to the third exemplary embodiments of the present invention, the K cyclic-shift values extracted from more than K cyclic-shift values may be allocated to the K users and be hopped with time.

In addition, the base station and the terminal may change the number of cyclic-shift values in accordance with a cell environment or a cell load, and this exemplary embodiment will be described below.

In a fourth exemplary embodiment of the present invention, the base station and the terminal classify entire sequences for the cyclic-shift values into a plurality of groups, and sets a minimum difference between the cyclic-shift values of each group to be greater than 1. For example, the base station and the terminal may divide all the sequences of Equation 5 into two groups as expressed in Equation 7. Then, when the number of the cyclic-shift values used in the cell is less than or equal to (K/2), the base station and the terminal set the cyclic-shift values with the sequences of the first group and hop the cyclic-shift values with time. Since the first group has the even-numbered cyclic-shift values, the minimum difference between the cyclic-shift values is 2. When the number of the cyclic-shift values used in the cell is greater than (K/2), the base station and the terminal set the cyclic-shift values with the sequences of the first and second groups and hop the cyclic-shift values with time. In this case, the minimum difference between the cyclic-shift values is 1.

$$\forall n, m_k(n) \in \{0,2,4,\ldots,K-1\}, 0 \le k \le K/2-1$$

$$\forall n, m_k(n) \in \{1,3,5,\ldots,K-2\}, K/2 \le k \le K-1 \qquad \text{Equation 7}$$

According to the fourth exemplary embodiment, when a small number of sequences are required in accordance with the time and the cell environment, the cyclic-shift values are allocated from the group in which the minimum difference between the sequences is great such that the interference between the users is reduced.

When the time delay spread of the radio channel is different according to surroundings of the cell, the cyclic-shift values may be allocated from the (K/2) sequences of the first group in the case of the great time delay spread, and the cyclic-shift values may be allocated from the K sequences in the case of a small time delay spread.

Figure 11:
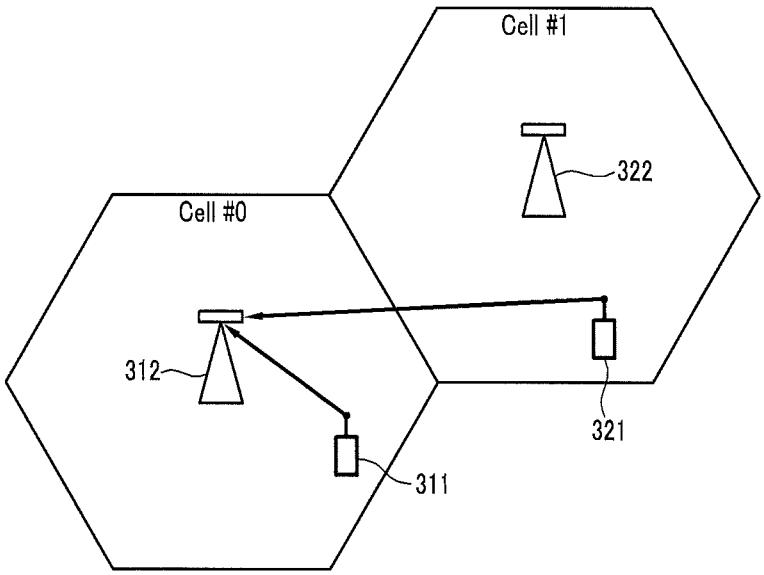
FIG. 11 shows a drawing for explaining interference between cells.

FIG. 11 shows a drawing for explaining the interference between the cells.

When a first user 311 uses a cell #0 of a first base station 312 as a home cell, and a second user 321 uses a cell #1 of a second base station 322 as the home cell, a signal transmitted by the second user may be received in the cell #0. In this case, if the first and second users have the same cyclic-shift hopping pattern, the CDM sequences of the two users may be continuously conflicted. Accordingly, the base station and the terminal according to a fifth exemplary embodiment of the present invention set the cyclic-shift hopping pattern based on the cell to which the user belongs as shown in Equation 8, Table 3, and Table 4.

$$i_n = [m_k(n) + H_c(n)]\% K \qquad \text{Equation 8}$$

Here, $H_c(n)$ denotes a cell code value allocated to the cell #c at the transmission time #n, K denotes the maximum number of the users, and % denotes the modulo operation.

TABLE 3

| | $i_0$ | ... $i_{N-1}$ |
|---|---|---|
| User #0 | $[m_0(0) + H_0(0)]\% K$ | ... $[m_0(N-1) + H_0(N-1)]\% K$ |
| User #1 | $[m_1(0) + H_0(0)]\% K$ | ... $[m_1(N-1) + H_0(N-1)]\% K$ |
| ... | ... | ... ... |
| User #(K − 1) | $[m_{K-1}(0) + H_0(0)]\% K$ | ... $[m_{K-1}(N-1) + H_0(N-1)]\% K$ |

TABLE 4

| | $i_0$ | ... $i_{N-1}$ |
|---|---|---|
| User #0 | $[m_0(0) + H_1(0)]\% K$ | ... $[m_0(N-1) + H_1(N-1)]\% K$ |
| User #1 | $[m_1(0) + H_1(0)]\% K$ | ... $[m_1(N-1) + H_1(N-1)]\% K$ |
| ... | ... | ... ... |
| User #(K − 1) | $[m_{K-1}(0) + H_1(0)]\% K$ | ... $[m_{K-1}(N-1) + H_1(N-1)]\% K$ |

According to the fifth exemplary embodiment, even though the user #k of the cell #0 and the user #k of the cell #1 use the same $m_k(n)$, the two users use different cyclic-shift values since the cell #0 and the cell #1 have different cells codes. Accordingly, since the users that belong to the different cells use the different CDM sequences at the same transmission time, the interference between the cells is prevented.

In the first to fifth exemplary embodiments of the present invention, it has been described that the basic sequence is fixed and the cyclic-shift is hopped to hop the CDM sequence. However, the basic sequence may be varied with time while the cyclic-shift is hopped such that the interference between the cells is reduced.

In addition, the cyclic-shift hopping pattern according to the exemplary embodiments of the present invention can be applicable to the case where the users are located at the different cells or sectors like a reference signal of a data channel used for a coherent demodulation of the data channel. This exemplary embodiment will be described with reference to FIG. 12 and FIG. 13.

Figure 12:
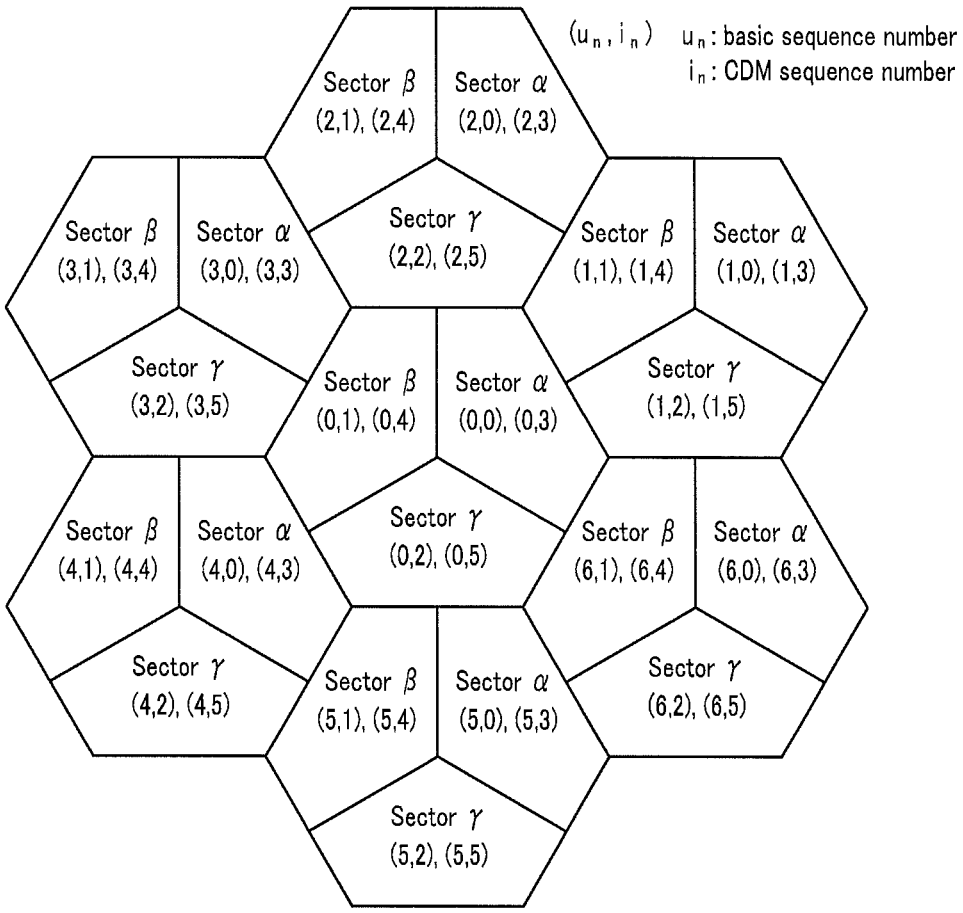
FIG. 12 shows an example of a method for arranging the reference signals of the data channels in a cellular environment.
Figure 13:
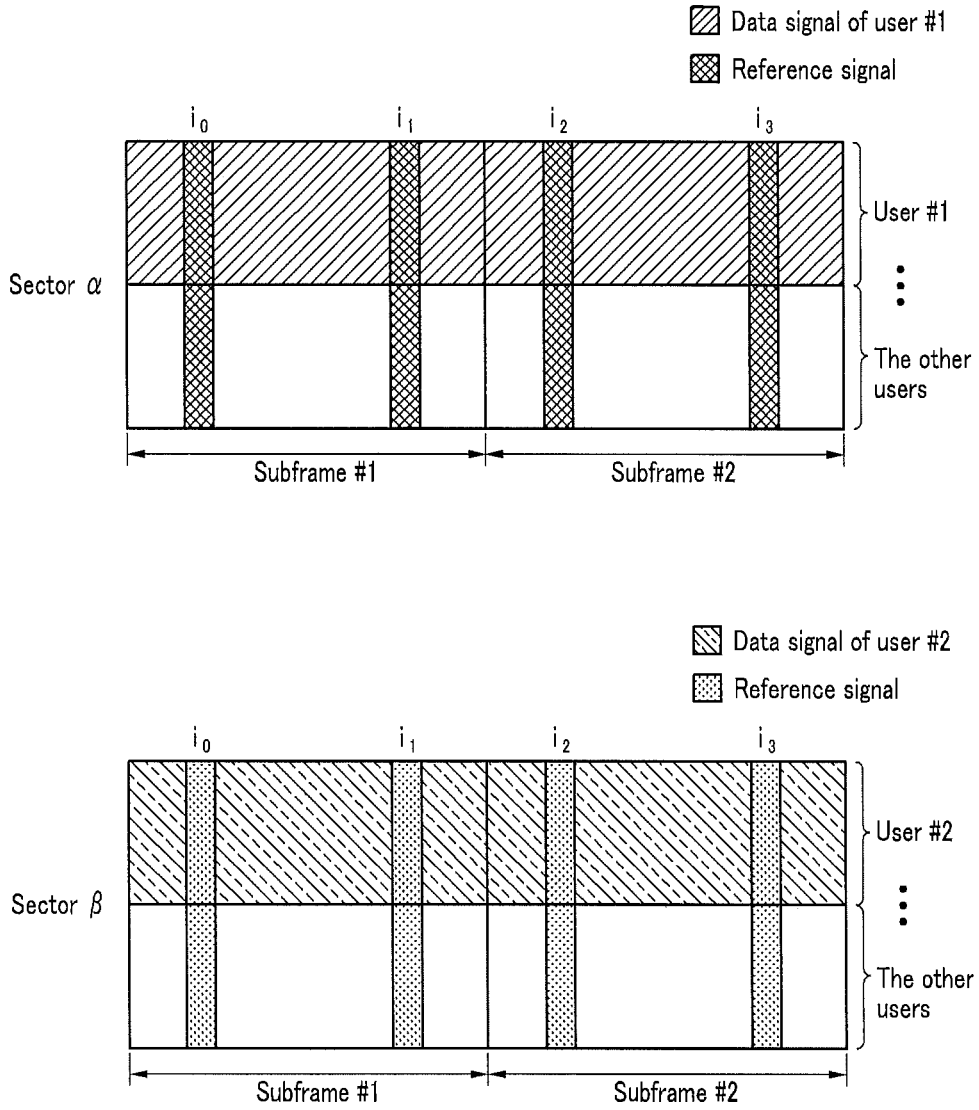
FIG. 13 shows an example of data transmission in two sectors located at the same base station.

FIG. 12 shows an example of a method for arranging the reference signals of the data channels in a cellular environment, and FIG. 13 shows an example of data transmission in two sectors located at the same base station. Seven base stations are shown in FIG. 12 for easy description.

As shown in FIG. 12, the seven base stations use different base sequences, i.e., basic sequence numbers $u_n$. Each base station includes three sectors, and the three sectors use sequences which are obtained by cyclic-shifting the same basic sequence by the different values. While it has been shown in FIG. 12 that two different cyclic-shift values are allocated to each sector, one cyclic-shift value can be allocated to each sector.

Referring to FIG. 13, a user #1 transmits data in a sector α, and the user #1 is differentiated form the other users of the sector a by the frequency. The data are transmitted in a subframe unit, and the reference signal which is common to all users of the sector α is transmitted twice in each subframe. A user #2 transmits data in a sector β, and the data transmission structure of the sector β is similar to the sector α. At this time, the interference between the users within one sector does not exist as shown in FIG. 13. However, the user #1 of the sector α and the user #2 of the sector β use the same time/frequency resources, and use sequences, which are obtained by cyclic-shifting the same basic sequence by the different values, as the reference signals, respectively. Herein, the interference between the users may exist when time delay in a channel is great. Accordingly, a sixth exemplary embodiment of the present invention randomizes the interference between the users by changing the cyclic-shift value with time. At this time, the basic sequence may be, changed with time.

Table 5 shows an example of a cyclic shift hopping pattern and a basic sequence hopping pattern on the reference signal of the data channel. Referring to Table 5, whenever the reference signal is transmitted, the basic sequence number $u_n$ and the cyclic-shift, i.e., the CDM sequence number $i_n$ is changed.

TABLE 5

| | | $(u_0, i_0)$ | $(u_1, i_1)$ | $(u_2, i_2)$ | $(u_3, i_3)$ |
|---|---|---|---|---|---|
| Base station #0 | Sector α | (0, 0) | (2, 0) | (0, 0) | (5, 0) |
| | Sector β | (0, 1) | (2, 2) | (0, 1) | (5, 2) |
| | Sector γ | (0, 2) | (2, 1) | (0, 2) | (5, 1) |
| | Sector α | (0, 3) | (2, 3) | (0, 3) | (5, 3) |
| | Sector β | (0, 4) | (2, 5) | (0, 4) | (5, 5) |
| | Sector γ | (0, 5) | (2, 4) | (0, 5) | (5, 4) |
| Base station #1 | Sector α | (1, 0) | (4, 0) | (2, 0) | (7, 0) |
| | Sector β | (1, 1) | (4, 2) | (2, 1) | (7, 2) |
| | Sector γ | (1, 2) | (4, 1) | (2, 2) | (7, 1) |
| | Sector α | (1, 3) | (4, 3) | (2, 3) | (7, 3) |
| | Sector β | (1, 4) | (4, 5) | (2, 4) | (7, 5) |
| | Sector γ | (1, 5) | (4, 4) | (2, 5) | (7, 4) |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiments of the present invention, but, on the contrary, are intended to be realized by a program for realizing functions corresponding to the configurations of the exemplary embodiments of the present invention or a recording medium for recording the program.

The invention claimed is:

1. A *communication* method[of transmitting an uplink signal at a terminal of a first user in a wireless communication system], the method comprising:

transmitting*, by a user equipment* (*UE*), a first sequence at a first transmission time, the first sequence being determined [by] *based on* a basic sequence and a first cyclic shift value[among a plurality of cyclic shift values including the first cyclic shift value, a second cyclic shift value, a third cyclic shift value, and a fourth cyclic shift value]; and transmitting*, by the UE*, a second sequence at a second transmission time after the first transmission time, the second sequence being determined [by] *based on* the basic sequence and [the] *a* second cyclic shift value,

[wherein at a terminal of a second user being different from the first user, a sequence determined by the basic sequence and the third cyclic shift value is transmitted at the first transmission time and a sequence determined by the basic sequence and the fourth cyclic shift value is transmitted at the second transmission time, and wherein a difference between the second cyclic shift value and the first cyclic shift value is different from a difference between the fourth cyclic shift value and the third cyclic shift value when the third cyclic shift value is adjacent to the first cyclic shift value]

*wherein the first cyclic shift value and the second cyclic shift value are UE-specific.*

2. The method of claim 1, wherein the second cyclic shift value is determined based on the first cyclic shift value[, and the fourth cyclic shift value is determined based on the third cyclic shift value].

3. The method of claim 1, wherein the first sequence is defined by a product of the basic sequence and a complex sine wave corresponding to the first cyclic shift value, and the second sequence is defined by a product of the basic sequence and a complex sine wave corresponding to the second cyclic shift value.

4. The method of claim 1, wherein the first [sequence is given by cyclic-shifting the basic sequence by the first cyclic shift value in a time domain, and the second sequence is given by cyclic-shifting the basic sequence by the second cyclic shift value in a time domain] *cyclic shift value is determined also based on a first symbol number of the first transmission time, and the second cyclic shift value is determined also based on a second symbol number of the second transmission time.*

5. The method of claim 1, wherein each of the first sequence and the second sequence $\bar{c}_{i_n}^{(k)}$ is given as follows:

$$\bar{c}_{i_n}^{(k)} = \bar{c}_0 \otimes \bar{\psi}_{i_n}^{(k)}$$

$$\bar{c}_0 = [\, c_0(0) \;\; c_0(1) \;\; \ldots \;\; c_0(N_f - 1)\,]^T$$

$$\bar{\psi}_{i_n}^{(k)} = \left[\, 1 e^{-j\frac{2\pi}{N_f}\Delta\tau i_n(k)} \;\; \ldots \;\; e^{-j\frac{2\pi}{N_f}(N_f-1)\Delta\tau i_n(k)} \,\right]^T,$$

wherein $\bar{c}_o$ denotes the basic sequence, $\Delta\tau \cdot i_n(k)$ denotes the first or second cyclic-shift value, and $N_f$ denotes the number of subcarriers.

[6. A method of receiving an uplink signal at a base station in a wireless communication system, the method comprising:

receiving a first sequence from a first terminal of a first user at a first transmission time, the first sequence being determined by a basic sequence and a first cyclic shift value among a plurality of cyclic shift values including the first cyclic shift value, a second cyclic shift value, a third cyclic shift value, and a fourth cyclic shift value;

receiving a second sequence from the first terminal at a second transmission time after the first transmission time, the second sequence being determined by the basic sequence and the second cyclic shift value;

receiving a third sequence from a second terminal of a second user at the first transmission time, the second user being different from the first user and the third sequence being determined by the basic sequence and the third cyclic shift value; and receiving a fourth sequence from the second terminal at the second transmission time, the fourth sequence being determined by the basic sequence and the fourth cyclic shift value, wherein a difference between the second cyclic shift value and the first cyclic shift value is different from a difference between the fourth cyclic shift value and the third cyclic shift value when the third cyclic shift value is adjacent to the first cyclic shift value.]

[7. The method of claim 6, wherein the second cyclic shift value is determined based on the first cyclic shift value, and the fourth cyclic shift value is determined based on the third cyclic shift value.]

[8. The method of claim 6, wherein the first sequence is defined by a product of the basic sequence and a complex sine wave corresponding to the first cyclic shift value, and the second sequence is defined by a product of the basic sequence and a complex sine wave corresponding to the second cyclic shift value.]

[9. The method of claim 6, wherein the first sequence is given by cyclic-shifting the basic sequence by the first cyclic shift value in a time domain, and the second sequence is given by cyclic-shifting the basic sequence by the second cyclic shift value in a time domain.]

[10. The method of claim 6, wherein each of the first sequence and the second sequence $\bar{c}_{i_n}^{(k)}$ is given as follows:

$$\bar{c}_{i_n}^{(k)} = \bar{c}_0 \otimes \bar{\psi}_{i_n}^{(k)}$$

$$\bar{c}_0 = [\, c_0(0) \;\; c_0(1) \;\; \ldots \;\; c_0(N_f - 1)\,]^T$$

$$\bar{\psi}_{i_n}^{(k)} = \left[\, 1 e^{-j\frac{2\pi}{N_f}\Delta\tau i_n(k)} \;\; \ldots \;\; e^{-j\frac{2\pi}{N_f}(N_f-1)\Delta\tau i_n(k)} \,\right]^T,$$

wherein $\bar{c}_o$ denotes the basic sequence, $\Delta\tau \cdot i_n(k)$ denotes the first or second cyclic-shift value, and $N_f$ denotes the number of subcarriers.]

[11. An apparatus for transmitting an uplink signal at a terminal of a first user in a wireless communication system, the method comprising:

a mapper configured to generate a first sequence and a second sequence, the first sequence being determined by a basic sequence and a first cyclic shift value among a plurality of cyclic shift values including the first cyclic shift value, a second cyclic shift value, a third cyclic shift value, and a fourth cyclic shift value, and the second sequence being determined by the basic sequence and the second cyclic shift value; and a transmitter configured to transmit the first sequence at a first transmission time and transmit the second sequence at a second transmission time after the first transmission time, wherein at a terminal of a second user being different from the first user, a sequence determined by the basic sequence and the third cyclic shift value is transmitted at the first transmission time and a sequence determined by the basic sequence and the fourth cyclic shift value is transmitted at the second transmission time, and wherein a difference between the second cyclic shift value and the first cyclic shift value is different from a difference between the fourth cyclic shift value and the third cyclic shift value when the third cyclic shift value is adjacent to the first cyclic shift value.]

[12. The apparatus of claim 11, wherein the second cyclic shift value is determined based on the first cyclic shift value, and the fourth cyclic shift value is determined based on the third cyclic shift value.]

[13. The apparatus of claim 11, wherein the first sequence is defined by a product of the basic sequence and a complex sine wave corresponding to the first cyclic shift value, and the second sequence is defined by a product of the basic sequence and a complex sine wave corresponding to the second cyclic shift value.]

[14. The apparatus of claim 11, wherein the first sequence is given by cyclic-shifting the basic sequence by the first cyclic shift value in a time domain, and the second sequence is given by cyclic-shifting the basic sequence by the second cyclic shift value in a time domain.]

[15. The apparatus of claim 11, wherein each of the first sequence and the second sequence $\bar{c}_{i_n}^{(k)}$ is given as follows:

$$\bar{c}_{i_n}^{(k)} = \bar{c}_0 \otimes \bar{\psi}_{i_n}^{(k)}$$

$$\bar{c}_0 = [c_0(0)\ \ c_0(1)\ \ \ldots\ \ c_0(N_f - 1)]^T$$

$$\bar{\psi}_{i_n}^{(k)} = \left[1\ e^{-j\frac{2\pi}{N_f}\Delta\tau i_n(k)}\ \ \ldots\ \ e^{-j\frac{2\pi}{N_f}(N_f-1)\Delta\tau i_n(k)}\right]^T,$$

wherein $\bar{c}_o$ denotes the basic sequence, $\Delta\tau \cdot i_n(k)$ denotes the first or second cyclic-shift value, and $N_f$ denotes the number of subcarriers.]

[16. An apparatus of receiving an uplink signal at a base station in a wireless communication system, the method comprising:

a first receiver configured to receive a first sequence from a first terminal of a first user at a first transmission time and receive a second sequence from the first terminal at a second transmission time after the first transmission time, the first sequence being determined by a basic sequence and a first cyclic shift value among a plurality of cyclic shift values including the first cyclic shift value, a second cyclic shift value, a third cyclic shift value, and a fourth cyclic shift value, and the second sequence being determined by the basic sequence and the second cyclic shift value; and a second receiver configured to receive a third sequence from a second terminal of a second user at the first transmission time and receive a fourth sequence from the second terminal at the second transmission time, the second user being different from the first user and the third sequence being determined by the basic sequence and the third cyclic shift value and the fourth sequence being determined by the basic sequence and the fourth cyclic shift value, wherein a difference between the second cyclic shift value and the first cyclic shift value is different from a difference between the fourth cyclic shift value and the third cyclic shift value when the third cyclic shift value is adjacent to the first cyclic shift value.]

[17. The apparatus of claim 16, wherein the second cyclic shift value is determined based on the first cyclic shift value, and the fourth cyclic shift value is determined based on the third cyclic shift value.]

[18. The apparatus of claim 16, wherein the first sequence is defined by a product of the basic sequence and a complex sine wave corresponding to the first cyclic shift value, and the second sequence is defined by a product of the basic sequence and a complex sine wave corresponding to the second cyclic shift value.]

[19. The apparatus of claim 16, wherein the first sequence is given by cyclic-shifting the basic sequence by the first cyclic shift value in a time domain, and the second sequence is given by cyclic-shifting the basic sequence by the second cyclic shift value in a time domain.]

[20. The apparatus of claim 16, wherein each of the first sequence and the second sequence $\bar{c}_{i_n}^{(k)}$ is given as follows:

$$\bar{c}_{i_n}^{(k)} = \bar{c}_0 \otimes \bar{\psi}_{i_n}^{(k)}$$

-continued $$\bar{c}_0 = [c_0(0)\ \ c_0(1)\ \ \ldots\ \ c_0(N_f - 1)]^T$$

$$\bar{\psi}_{i_n}^{(k)} = \left[1\ e^{-j\frac{2\pi}{N_f}\Delta\tau i_n(k)}\ \ \ldots\ \ e^{-j\frac{2\pi}{N_f}(N_f-1)\Delta\tau i_n(k)}\right]^T,$$

wherein $\bar{c}_o$ denotes the basic sequence, $\Delta\tau \cdot i_n(k)$ denotes the first or second cyclic-shift value, and $N_f$ denotes the number of subcarriers.]

*21. The communication method of claim 1, further comprising:*

*transmitting, from another UE, a third sequence at the first transmission time, the another UE being different from the UE, and the third sequence being determined based on the basic sequence and a third cyclic shift value; and*

*transmitting, from the another UE, a fourth sequence at the second transmission time, the fourth sequence being determined based on the basic sequence and a fourth cyclic shift value,*

*wherein, when the first cyclic shift value is equal to the third cyclic shift value plus one (1), the second cyclic shift value is not equal to the fourth cyclic shift value plus one (1).*

*22. A communication apparatus, comprising:*

*a processor, and*

*a memory operably coupled to the processor,*

*wherein the memory stores program instructions which:*

*cause the communication apparatus to transmit a first sequence to a base station at a first transmission time, the first sequence being determined based on a basic sequence and a first cyclic shift value; and*

*cause the communication apparatus to transmit a second sequence to the base station at a second transmission time after the first transmission time, the second sequence being determined based on the basic sequence and a second cyclic shift value,*

*wherein the first cyclic shift value and the second cyclic shift value are UE-specific.*

*23. The apparatus of claim 22, wherein the second cyclic shift value is determined based on the first cyclic shift value.*

*24. The apparatus of claim 22, wherein the first sequence is defined by a product of the basic sequence and a complex sine wave corresponding to the first cyclic shift value, and*

*the second sequence is defined by a product of the basic sequence and a complex sine wave corresponding to the second cyclic shift value.*

*25. The apparatus of claim 22, wherein the first cyclic shift value is determined also based on a first symbol number of the first transmission time, and the second cyclic shift value is determined also based on a second symbol number of the second transmission time.*

*26. The apparatus of claim 22, wherein each of the first sequence and the second sequence $\bar{c}_{i_n}^{(k)}$ is given as follows:*

$$\bar{c}_{i_n}^{(k)} = \bar{c}_0 \otimes \bar{\psi}_{i_n}^{(k)}$$

$$\bar{c}_0 = [c_0(0)\ \ c_0(1)\ \ \ldots\ \ c_0(N_f - 1)]^T$$

$$\bar{\psi}_{i_n}^{(k)} = \left[1\ e^{-j\frac{2\pi}{N_f}\Delta\tau i_n(k)}\ \ \ldots\ \ e^{-j\frac{2\pi}{N_f}(N_f-1)\Delta\tau i_n(k)}\right]^T,$$

*wherein $\bar{c}_O$ denotes the basic sequence, $\Delta\tau \cdot i_n(k)$ denotes the first or second cyclic-shift value, and $N_f$ denotes the number of subcarriers.*

*27. The communication apparatus of claim 22, wherein another communication apparatus transmits a third*

*sequence at the first transmission time, the another communication apparatus being different from the communication apparatus, and the third sequence being determined based on the basic sequence and a third cyclic shift value,*

*wherein the another communication apparatus transmits a fourth sequence at the second transmission time, the fourth sequence being determined based on the basic sequence and a fourth cyclic shift value, and*

*wherein, when the first cyclic shift value is equal to the third cyclic shift value plus one (1), the second cyclic shift value is not equal to the fourth cyclic shift value plus one (1).*

*28. A communication method, comprising:*

*receiving, from a first user equipment (UE), a first sequence at a first transmission time, the first sequence being determined based on a basic sequence and a first cyclic shift value; and*

*receiving, from the first UE, a second sequence at a second transmission time after the first transmission time, the second sequence being determined based on the basic sequence and a second cyclic shift value,*

*receiving, from a second UE, a third sequence at the first transmission time, the second UE being different from the first UE, and the third sequence being determined based on the basic sequence and a third cyclic shift value; and*

*receiving, from the second UE, a fourth sequence at the second transmission time, the fourth sequence being determined based on the basic sequence and a fourth cyclic shift value,*

*wherein, when the first cyclic shift value is equal to the third cyclic shift value plus one (1), the second cyclic shift value is not equal to the fourth cyclic shift value plus one (1).*

*29. The method of claim 28, wherein the second cyclic shift value is determined based on the first cyclic shift value.*

*30. The method of claim 28, wherein the first sequence is defined by a product of the basic sequence and a complex sine wave corresponding to the first cyclic shift value, and*

*the second sequence is defined by a product of the basic sequence and a complex sine wave corresponding to the second cyclic shift value.*

*31. The method of claim 28, wherein the first cyclic shift value is determined also based on a first symbol number of the first transmission time, and the second cyclic shift value is determined also based on a second symbol number of the second transmission time.*

*32. The method of claim 28, wherein each of the first sequence and the second sequence* $\bar{c}_{i_n}^{(k)}$ *is given as follows:*

$$\bar{c}_{i_n}^{(k)} = \bar{c}_0 \otimes \bar{\psi}_{i_n}^{(k)}$$

$$\bar{c}_0 = [\, c_0(0) \;\; c_0(1) \;\; \ldots \;\; c_0(N_f - 1)\,]^T$$

$$\bar{\psi}_{i_n}^{(k)} = \left[\, 1 e^{-j\frac{2\pi}{N_f}\Delta\tau i_n(k)} \;\; \ldots \;\; e^{-j\frac{2\pi}{N_f}(N_f-1)\Delta\tau i_n(k)} \,\right]^T,$$

*wherein* $\bar{c}_0$ *denotes the basic sequence,* $\Delta\tau \cdot i_n(k)$ *denotes the first or second cyclic-shift value, and* $N_f$ *denotes the number of subcarriers.*

*33. The communication method of claim 28, wherein the first cyclic shift value and the second cyclic shift value are UE-specific.*

*34. A communication apparatus, comprising:*

*a processor, and*

*a memory operably coupled to the processor,*

*wherein the memory stores program instructions which:*

*cause the apparatus to receive a first sequence from a first user equipment (UE) at a first transmission time, the first sequence being determined based on a basic sequence and a first cyclic shift value; and*

*cause the apparatus to receive a second sequence from the first UE at a second transmission time after the first transmission time, the second sequence being determined based on the basic sequence and a second cyclic shift value;*

*cause the apparatus to receive a third sequence from a second UE at the first transmission time, the second UE being different from the first UE, and the third sequence being determined based on the basic sequence and a third cyclic shift value; and*

*cause the apparatus to receive a fourth sequence from the second UE at the second transmission time, the fourth sequence being determined based on the basic sequence and a fourth cyclic shift value,*

*wherein, when the first cyclic shift value is equal to the third cyclic shift value plus one (1), the second cyclic shift value is not equal to the fourth cyclic shift value plus one (1).*

*35. The apparatus of claim 34, wherein the second cyclic shift value is determined based on the first cyclic shift value.*

*36. The apparatus of claim 34, wherein the first sequence is defined by a product of the basic sequence and a complex sine wave corresponding to the first cyclic shift value, and*

*the second sequence is defined by a product of the basic sequence and a complex sine wave corresponding to the second cyclic shift value.*

*37. The apparatus of claim 34, wherein the first cyclic shift value is determined also based on a first symbol number of the first transmission time, and the second cyclic shift value is determined also based on a second symbol number of the second transmission time.*

*38. The apparatus of claim 34, wherein each of the first sequence and the second sequence* $\bar{c}_{i_n}^{(k)}$ *is given as follows:*

$$\bar{c}_{i_n}^{(k)} = \bar{c}_0 \otimes \bar{\psi}_{i_n}^{(k)}$$

$$\bar{c}_0 = [\, c_0(0) \;\; c_0(1) \;\; \ldots \;\; c_0(N_f - 1)\,]^T$$

$$\bar{\psi}_{i_n}^{(k)} = \left[\, 1 e^{-j\frac{2\pi}{N_f}\Delta\tau i_n(k)} \;\; \ldots \;\; e^{-j\frac{2\pi}{N_f}(N_f-1)\Delta\tau i_n(k)} \,\right]^T,$$

*wherein* $\bar{c}_0$ *denotes the basic sequence,* $\Delta\tau \cdot i_n(k)$ *denotes the first or second cyclic-shift value, and* $N_f$ *denotes the number of subcarriers.*

*39. The communication apparatus of claim 34, wherein the first cyclic shift value and the second cyclic shift value are UE-specific.*

* * * * *